(12) United States Patent
Hando et al.

(10) Patent No.: US 11,550,293 B2
(45) Date of Patent: Jan. 10, 2023

(54) BOARD PRODUCTION MANAGEMENT DEVICE AND BOARD PRODUCTION MANAGEMENT METHOD TO DETERMINE A COUNTERMEASURE TO A BOARD PRODUCTION DEVICE ERROR

(71) Applicant: FUJI CORPORATION, Chiryu (JP)

(72) Inventors: Hiroyuki Hando, Komaki (JP); Koji Shimizu, Kouta-cho (JP)

(73) Assignee: FUJI CORPORATION, Chiryu (JP)

( * ) Notice: Subject to any disclaimer, the term of this patent is extended or adjusted under 35 U.S.C. 154(b) by 527 days.

(21) Appl. No.: 16/317,870

(22) PCT Filed: Jul. 25, 2016

(86) PCT No.: PCT/JP2016/071764
§ 371 (c)(1),
(2) Date: Jan. 15, 2019

(87) PCT Pub. No.: WO2018/020556
PCT Pub. Date: Feb. 1, 2018

(65) Prior Publication Data
US 2021/0149364 A1 May 20, 2021

(51) Int. Cl.
*G05B 19/406* (2006.01)

(52) U.S. Cl.
CPC .. *G05B 19/406* (2013.01); *G05B 2219/34082* (2013.01); *G05B 2219/45026* (2013.01);
(Continued)

(58) Field of Classification Search
CPC ........ G05B 19/406; G05B 2219/45103; G05B 2219/45026; G05B 2219/34082; G05B 2219/45029
See application file for complete search history.

(56) References Cited

U.S. PATENT DOCUMENTS 5,607,097 A    3/1997  Sato et al.
8,473,320 B1 *  6/2013  Judy .............. G06Q 10/063112
                                                    705/7.14
(Continued)

FOREIGN PATENT DOCUMENTS

JP     4-161823 A    6/1992
JP      7-7262 A    1/1995
(Continued)

OTHER PUBLICATIONS

International Search Report dated Oct. 11, 2016 in PCT/JP2016/071764 filed on Jul. 25, 2016.
(Continued)

*Primary Examiner* — Kenneth M Lo
*Assistant Examiner* — Tameem D Siddiquee
(74) *Attorney, Agent, or Firm* — Oblon, McClelland, Maier & Neustadt, L.L.P.

(57) ABSTRACT

A board production management device for managing a board production line including a solution memory section for linking and storing a problem event that may occur in a board production line and that requires a countermeasure operation, a solution to serve as the countermeasure operation, and a set authority level set for a worker who may implement the solution; an solution memory section for authenticating the authority level of a worker who implements the countermeasure operation; and a solution notification section for separately reporting, when a problem event occurs, an executable solution corresponding to a set authority level equal to or less than the authority level, and an unexecutable solution corresponding to a set authority level exceeding the authority level.

6 Claims, 5 Drawing Sheets

(52) U.S. Cl.
CPC .............. *G05B 2219/45029* (2013.01); *G05B 2219/45103* (2013.01)

(56) References Cited

U.S. PATENT DOCUMENTS

| | | | | |
|---|---|---|---|---|
| 2003/0028353 A1* | 2/2003 | Gventer | ............... | G05B 13/027 |
| | | | | 702/182 |
| 2003/0036808 A1* | 2/2003 | Kato | ................... | G05B 19/409 |
| | | | | 700/3 |
| 2003/0225472 A1 | 12/2003 | Kato | | |
| 2004/0153868 A1* | 8/2004 | Nonaka | ................. | G06Q 10/10 |
| | | | | 714/47.2 |
| 2005/0251276 A1* | 11/2005 | Shen | ................... | G05B 23/024 |
| | | | | 700/108 |
| 2014/0058698 A1* | 2/2014 | Gu | ................... | G01R 31/31705 |
| | | | | 702/117 |
| 2014/0118154 A1* | 5/2014 | Grounds | ............... | G06Q 10/20 |
| | | | | 340/686.1 |
| 2016/0352752 A1* | 12/2016 | Bush | ................... | H04L 63/0838 |
| 2017/0330343 A1* | 11/2017 | Fujita | ................ | G06K 9/00335 |

FOREIGN PATENT DOCUMENTS

| | | |
|---|---|---|
| JP | 2014-63286 A | 4/2014 |
| JP | 2015-184884 A | 10/2015 |

OTHER PUBLICATIONS

Extended European Search Report dated Nov. 25, 2019 in European Patent Application No. 16910460.1, 8 pages.

* cited by examiner

FIG. 4

| | Problem event | No component found |
|---|---|---|
| | Occurrence location | First electronic component mounter |

| No. | Solution | Set authority level | Effectiveness |
|---|---|---|---|
| 1 | Check feeder (check peeling of cover tape) | L1 | E1 |
| 2 | Check feeder (check peeling of splicing tape) | L1 | E2 |
| 3 | Check feeder (check for separation from reel center pin) | L1 | E3 |
| 4 | Check feeder (check deviation of pickup position) | L1 | E4 |
| 5 | Check feeder (check for foreign matter in tape guide) | L1 | E5 |
| 6 | Check feeder (check feeding speed setting) | L1 | E6 |
| 7 | Check feeder (check engaging of chip components to winding gear) | L1 | E7 |
| 8 | Check feeder (check feeder pitch setting) | L1 | E8 |
| 9 | Exchange feeder | L1 | E9 |
| 10 | Check nozzle (check tip for foreign matter) | L1 | E10 |
| 11 | Check nozzle (blockage in tip) | L1 | E11 |
| 12 | Check nozzle (tip sliding) | L1 | E12 |
| 13 | Check nozzle (damaged tip) | L1 | E13 |
| 14 | Check nozzle (damaged rubber) | L1 | E14 |
| 15 | Edit pickup height | (L2) | E15 |
| 16 | Edit nozzle raising and lowering speed | (L2) | E16 |
| 17 | Edit tape feeding speed | (L2) | E17 |
| 18 | Exchange nozzle | (L2) | E18 |
| 19 | Exchange reel (same electronic components) | (L2) | E19 |
| 20 | Edit soft pickup | (L2) | E20 |
| 21 | Edit device offset | (L2) | E21 |
| 22 | Edit component data | (L2) | E22 |
| 23 | Edit pickup position | (L2) | E23 |
| 24 | Component camera lens contamination, fallen components | L1 | E24 |
| 25 | Maintenance or exchange of mounting head | (L2) | E25 |

(Notify high-rank worker)

BOARD PRODUCTION MANAGEMENT DEVICE AND BOARD PRODUCTION MANAGEMENT METHOD TO DETERMINE A COUNTERMEASURE TO A BOARD PRODUCTION DEVICE ERROR

TECHNICAL FIELD

The present application relates to a board production management device for managing a board production line or a board production device, and more particularly, to the operation of multiple solutions for handling problem events occurring in a board production line or a board production device.

BACKGROUND ART

Equipment for producing a board on which a large number of electronic components are mounted includes solder printing machines, electronic component mounting machines, reflow machines, board inspection machines, and the like. It is common to configure a board production line by linking these board production devices together. Operation of the board production line is generally managed by a board production management device called a host computer. When a problem event occurs in the board production line, such as a malfunction of a board production device or a decrease in a production management index, a countermeasure operation by a worker is required. In this case, the host computer reports the occurrence of the problem event and requests implementation of the countermeasure operation.

Here, there are generally multiple candidate solutions for the countermeasure operation, and a countermeasure operation cannot be effective unless an appropriate solution is selected in response to the problem event. For example, inexperienced operators tend to be unaware of the underlying causes of such problem events and tend to try a variety of ineffective solutions based on trial and error. On the other hand, skilled engineers tend to accurately understand the occurrence of such problem events and implement high-precision solutions.

Thus, with respect to countermeasure operations for resolving problem events, the precision of the solution implemented depends on the skill level of the operator.

In recent years, technologies have been spreading for collecting and accumulating problem events that have occurred in the past, solutions that have been implemented, and the effect amount of the solutions. Such techniques are called learning systems, knowledge systems, artificial intelligence, etc. By applying a learning system to problem events in the board production line, past experiences with countermeasure operations can be exploited to improve the effectiveness rate of each solution and facilitate the selection of appropriate solutions. Examples of techniques related to problem events and solutions of board production lines are disclosed in Patent Literature 1 to 4.

Patent Literature 1 discloses a system for assisting an operator to be more motivated in their work on a board production line. The system includes a proficiency specifying section for specifying the degree of proficiency of an operator and an information providing section for providing the operator with information that contributes to work efficiency of the operator, and the classification of information provided by the information providing section differs in accordance with the degree of proficiency of the operator. With this, the operator forms a desire to obtain more sophisticated information useful for upgrading their own skills, thereby increasing motivation.

The problem diagnosis system of Patent Literature 2 includes a monitoring section, a database, and a diagnostic section. The monitoring section encodes pattern changes in data within a predetermined period before a problem occurred to generate a pattern code. The database stores the pattern code, the cause of the problem, and the frequency of occurrence of the same problem in the same pattern code. The diagnostic section searches the database for the pattern code at the time of occurrence of the problem, and presents the cause of occurrence of the problem in descending order of occurrence frequency. With this, the cause of the problem can be detected in a short time period. This is one type of learning system, and a technique of a learning system targeting a board production line is also disclosed in Patent Literature 3 and 4.

PATENT LITERATURE

Patent Literature 1: JP-A-2015-184884
Patent Literature 2: JP-A-Hei4-161823
Patent Literature 3: JP-A-2014-63286
Patent Literature 4: JP-A-Hei7-7262

BRIEF SUMMARY

Technical Problem

Among multiple candidate solutions for handling a problem event in a board production line, there are solutions in which conditions that can be implemented are restricted, and solutions in which it is difficult to reinstate the original operating conditions once the operating conditions are changed. For example, a solution of recalibrating a coordinate system serving as a reference for the position of a stopped board may not be able to be performed when a board for a product is loaded, and it may be time-consuming and difficult to reinstate the original coordinate system after the recalibration is performed. Therefore, if an inexperienced operator carelessly attempts a recalibration, another problem event may be caused. In other words, some of the candidate solutions need to be implemented with care.

Further, in applying a learning system to a problem event in a board production line, a solution implemented by a skilled engineer is considered a useful reference. However, if a solution implemented by an inexperienced operator, in other words, a solution that tends to be ineffective, is equally evaluated and learned, an improvement in precision cannot be expected. In other words, the precision of the effectiveness rate of each solution is not improved. Therefore, it is desirable to consider the skill level of the operator who implements solutions when learning is performed on the implemented solutions.

The present disclosure has been made in view of the above-mentioned problems of the background art, and it is an object of the present disclosure to provide a board production management device and a board production management method capable of contributing to a quick solution for a problem event by appropriately applying multiple solutions for handling problem events in a board production line.

Solution to Problem

A board production management device disclosed in this specification is a board production management device for managing a board production line that produces a board on which an electronic component is mounted or for managing a board production device constituting the board production line, the board production management device comprising: a solution memory section configured to link and store a problem event that may occur in the board production line or the board production device and that requires a countermeasure operation, a solution to serve as the countermeasure operation, and a set authority level that is set to a worker who may implement the solution; an authority authenticating section configured to authenticate an execution authority level that is the authority level of the worker implementing the countermeasure operation; and a solution notification section configured to separately report, when the problem event occurs, an executable solution corresponding to a set authority level equal to or less than the execution authority level, and an unexecutable solution corresponding to a set authority level exceeding the execution authority level.

Another board production management device disclosed in this specification is a board production management device for managing a board production line, for producing a board on which electronic components are mounted, or a board production management device constituting the board production line, comprising: a solution memory section configured to link and store a problem event that may occur in the board production line or the board production device and that requires a countermeasure operation, a solution to serve as the countermeasure operation, and an effectiveness rate that indicates an extent to which the solution contributes to resolving the problem event; an authority authenticating section configured to authenticate an execution authority level of that is the authority level of the a worker implementing the countermeasure operation; an effect amount collection section for linking and collecting, when the problem event occurs, the execution authority level of the worker, the solution implemented by the worker, and an effect amount obtained by the implemented solution; and an effectiveness-rate learning section configured to correct the effectiveness rate of the implemented solution by setting a magnitude of a learning coefficient according to the authority level of the worker, multiplying the obtained effect amount by the learning coefficient, and feeding back the result to the effectiveness rate.

A board production management method disclosed in this specification is a board production management method for managing a board production line, which produces a board on which electronic components are mounted, or a board production management device constituting the board production line, comprising: a solution memory step for linking and storing a problem event that may occur in the board production line or the board production device and requires a countermeasure operation, a solution to serve as the countermeasure operation, and a set authority level that is set to a worker who may implement the solution; an authority authentication step for authenticating an execution authority level that is the authority level of the worker implementing the countermeasure operation; and a solution notification step for separately displaying, when the problem event occurs, an executable solution corresponding to a set authority level equal to or less than the authority level, and an unexecutable solution corresponding to a set authority level exceeding the execution authority level.

A board production management method for managing a board production line, which produces a board on which electronic components are mounted, or a board production management device constituting the board production line, comprising: a solution memory step for linking and storing a problem event that may occur in the board production line or the board production device and requires a countermeasure operation, a solution to serve as the countermeasure operation, and an effectiveness rate that indicates an extent to which the solution contributes to resolving the problem event; an authority authentication step for authenticating an execution authority level that is an authority of a worker implementing the countermeasure operation; an effect amount collection step for linking and collecting, when the problem event occurs, the authority level of the worker, the solution implemented by the worker, and an effect amount obtained by the implemented solution; and an effectiveness rate learning step for correcting the effectiveness rate of the implemented solution by setting a magnitude of a learning coefficient according to the authority level of the worker, multiplying the obtained effect amount by the learning coefficient, and feeding back the result to the effectiveness rate.

Advantageous Effects

In the board production management device disclosed in this specification, when a problem event occurs, the solution notification section compares the authority level of the worker with the set authority level of the solution, and separately reports the solution that can be implemented by the worker and the solution that cannot be implemented by the worker. Here, a high set authority level is set to solutions that should be implemented carefully. As a result, there is no risk that an inexperienced worker will carelessly implement a solution that should be carefully implemented thereby causing another problem event, which contributes to a quick resolution of the problem event.

Further, in another board production management device disclosed in this specification, the effectiveness-rate learning section corrects the effectiveness rate of the executed solution by setting the magnitude of the learning coefficient according to the authority level of the worker, then multiplying the obtained effect amount by the learning coefficient to feed back the result. That is, the effectiveness rate is corrected by multiplying a high-precision solution implemented by a worker with a high-rank authority level by a large learning coefficient, while multiplying a low-precision solution implemented by a worker with a low-rank authority level by a small learning coefficient. As a result, high-precision solutions can be prioritized and the accuracy of the effectiveness rate value can be increased, thereby contributing to a quick resolution of the problem event.

Further, the board production management method disclosed herein may have the same effect as the board production management device disclosed herein and contribute to a quick resolution of the problem event. Also, another board production management method disclosed in this specification has the same effect as another board production management device disclosed in this specification, and can contribute to a quick resolution of a problem event.

BRIEF DESCRIPTION OF DRAWINGS

FIG. 4 is a diagram showing an example of a screen on which an example of a notification of a solution notification section is displayed.

DESCRIPTION OF EMBODIMENTS

Figure 1:
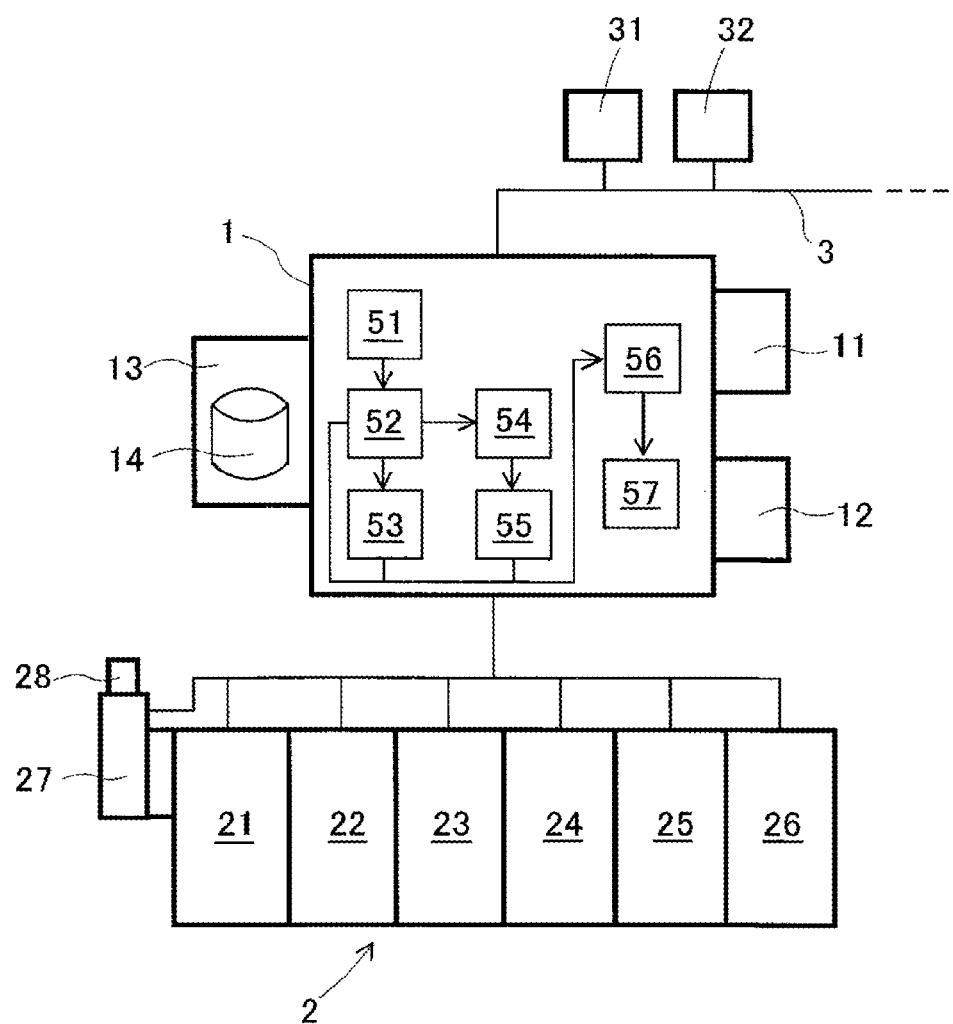
FIG. 1 is a diagram schematically showing a configuration of a board production management device of an embodiment together with a board production line.

1. Configuration of Board Production Management Device 1 and Board Production Line 2 of an Embodiment Referring to FIGS. 1 to 6, board production management device 1 of an embodiment of the present disclosure will be described. FIG. 1 is a diagram schematically showing a configuration of board production management device 1 of the embodiment together with board production line 2. Illustrated board production line 2 is composed of six board production devices. Specifically, the board production line 2 includes solder printing machine 21, solder inspection machine 22, first electronic component mounter 23, second electronic component mounter 24, board appearance inspection machine 25, and reflow machine 26 arranged in a row.

Solder printing machine 21 prints a paste-like solder on a predetermined position of a board. Solder printing machine 21 includes, for example, a board conveyance device, a screen placed on the board, and a squeegee that moves on the screen to apply solder. Solder inspection machine 22 determines whether the printed state of solder on a board is good. Solder inspection machine 22 includes, for example, a board conveyance device, an image pickup camera that captures an image of printed solder to obtain image data, an image determination section that performs image processing on the image data to determine whether the image data is acceptable, and the like.

First electronic component mounter 23 and second electronic component mounter 24 mount electronic components on boards. Electronic component mounters 23 and 24 may have the same configuration or different configurations. Electronic component mounters 23 and 24 include a board conveyance device, a component supply device, a component transfer device, a component camera, and the like. The component supply device is configured by arranging multiple feeder devices on a pallet, for example. Each feeder device holds a reel on which carrier tape holding a number of electronic components is wound, the reel being held by each feeder device in an exchangeable manner. The component transfer device includes a mounting head holding a suction nozzle for picking up an electronic component, a head driving mechanism, and the like. The component transfer device picks up an electronic component from the component supply device and mounts it on the solder of the board. The component camera captures an image of the state in which the suction nozzle of the component transfer device picks up the electronic component, obtains image data, and performs image processing on the image data to check the pickup state of the electronic component.

Board appearance inspection machine 25 inspects the state of the electronic component mounted on the board. Board appearance inspection machine 25 includes, for example, a board conveyance device, an image pickup camera that captures an image of an electronic component and obtains image data, and an image determination section that performs image processing on the image data and determines whether the image data is defective. Reflow machine 26 heats and melts the paste-like solder, and then cools the paste-like solder to ensure soldering. Reflow machine 26 is composed of, for example, a board conveyance device, a heating device, a cooling device, and the like.

The configuration of board production line 2 described above can be changed, and the structure of each board production device can also be changed. Rolling tower 27 is attached to board production line 2. Rolling tower 27 indicates that a countermeasure operation by an operator is necessary in board production line 2. That is, when a countermeasure operation is required, rolling tower 27 rotates top rotating lights 28 while causing them to turn on or blink. An operator who is on the same floor as board production line 2 can visually recognize the lighting or flashing of rotation light 28 even from a distance.

Board production management device 1 of the embodiment manages the operating state of board production line 2. Board production management device 1 is a computer device which has a CPU and operates by software, and is also called a host computer. Board production management device 1 includes display device 11, such as a liquid crystal display for showing various displays, input devices 12, such as a keyboard and a mouse for performing various settings, memory device 13, and the like. Board production management device 1 is connected to solder printing machine 21, solder inspection machine 22, first electronic component mounter 23, second electronic component mounter 24, board appearance inspection machine 25, and reflow machine 26 such that the items can individually communicate with each other. Board production management device 1 is also connected to rolling tower 27, and controls the display of rolling tower 27. Board production management device 1 can also manage multiple board production lines 2 collectively.

Solution database 14 is constructed in the memory device 13. Solution database 14 corresponds to the solution memory section of the present disclosure. Solution database 14 is constructed on the basis of problem events that have occurred in the past and the solutions that have been implemented in countermeasure operations. Solution database 14 links and stores problem events, solutions, set authority levels, and effectiveness rate of solutions.

A problem event refers to an abnormal state in which a board cannot be produced in board production line 2, or a state in which the production management index is lowered even if the board can be produced in board production line 2. Examples of an abnormal state include a state in which a pickup error, in which an electronic component cannot be picked up by electronic component mounters 23, 24, persists, a state in which an inspection cannot be performed by solder inspection machine 22 or board appearance inspection machine 25, or a state in which a board cannot be conveyed. Examples of a state in which the production management index is lowered include a decrease in the operation rate, an increase in the pickup error rate in electronic component mounters 23, 24, and an occurrence of a rejected board in solder inspection machine 22 or board appearance inspection machine 25.

Solutions are candidates for countermeasure operations to be performed to resolve problem events. Although there are multiple solutions for the majority of problem events, whether a solution is effective or ineffective depends on each problem event. Set authority level is set for each solution and is the authority level set for each operator who may implement each solution. In the present embodiment, there are two types of authority levels: normal authority level L1 for an operator, and high-rank authority level L2 for a high-rank worker. The effectiveness rate is a statistical and quantitative estimate of the effectiveness rate at which a solution contributes to resolving a problem event. The effectiveness rate is appropriately corrected by effectiveness-rate learning section 57, which will be described later.

Board production management device 1 is used as functional sections that operate when a problem event occurs in board production line 2, and board production management device 1 includes authority authenticating section 51, solution notification section 52, high-rank worker notification section 53, proxy application section 54, proxy approval section 55, effect amount collection section 56, and effectiveness-rate learning section 57. The detailed functions of these functional sections will be described later in the description of the operations and actions.

Board manufacturing control device 1 is connected to a number of personal computers 31 to 32 via in-house LAN 3. First personal computer 31 is used by an operator to whom the normal authority level L1 is set. The operator performs a normal operation that occurs when a board is being produced in board production line 2. Examples of normal operation include a component replenishment operation in response to a depletion of electronic components in electronic component mounters 23, 24, a solder replenishment operation in solder printing machine 21, and a setup changing work accompanying a change in the type of board to be produced.

Second personal computer 32 is used by a high-rank worker to whom the high-rank authority level L2 is set. High-rank worker refers to a line engineer who is responsible for board production line 2, a floor manager who is responsible for the entire floor including other board production lines in addition to board production line 2, and the like. Between board production management device 1 and personal computers 31, 32, and between personal computer 31 and personal computer 32, notification by e-mail with a specified mail address is possible. Operators and high-rank workers can access board production management device 1 by logging in from input device 12 and personal computers 31, 32.

2. Operation and Use of Board Production Control Device 1 of the Embodiment

Figure 2:
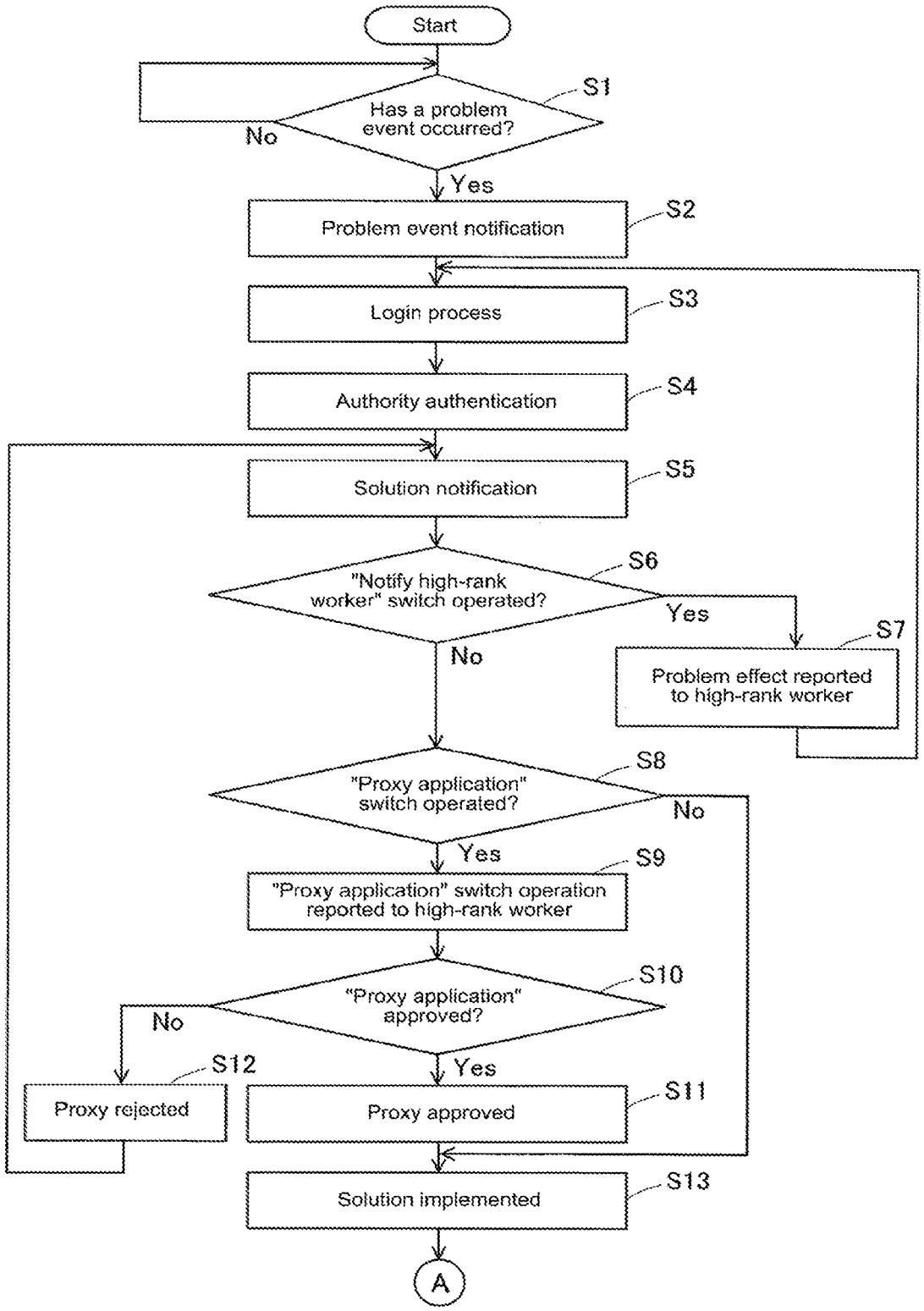
FIG. 2 is a diagram showing the first half of the process flow of the board production management device from the occurrence of a problem event to the implementation of a solution.
Figure 3:
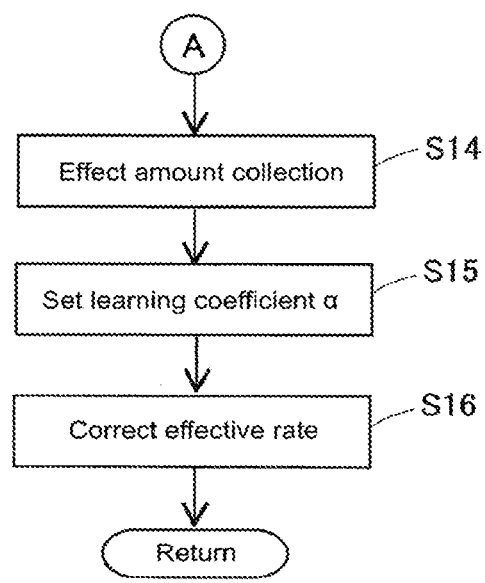
FIG. 3 is a diagram showing the latter half of the process flow of the board production management device from the implementation of the solution to the correction of the effectiveness rate.

Next, the operation and use of board production control device 1 of the embodiment will be described. FIG. 2 is a diagram showing the first half of the process flow of board production management device 1 from the occurrence of a problem event to the implementation of a solution. FIG. 3 is a diagram showing the latter half of the process flow of board production management device 1 from the implementation of the solution to the correction of the effectiveness rate. The following description with respect to FIGS. 2 and 3 also serves as a description of board production management method of the embodiment. The step of constructing solution database 14 in advance corresponds to a solution storing step of the present disclosure.

In step S1 of FIG. 2, board production management device 1 determines whether a problem event has occurred in board production line 2. Board production management device 1 repeats step S1 as long as a problem event does not occur, and proceeds to step S2 to execute the process when a problem event occurs. In step S2, board production management device 1 reports the occurrence of a problem event. This notification is displayed on display device 11 or transmitted to first personal computer 31 by e-mail and displayed. Further, board production management device 1 displays the occurrence of the problem event on rolling tower 27. When the operator notices the occurrence of a problem event, they performs the login process in step S3. As a result, board production management device 1 determines the operator as a worker who performs countermeasure operations.

In the next authority authentication step S4, authority authenticating section 51 authenticates the operator's execution authority level as the normal authority level L1. In the next solution notification step S5, solution notification section 52 separately reports an executable solution corresponding to a set authority level equal to or lower than normal authority level L1 of the operator and an unexecutable solution corresponding to a set authority level exceeding the normal authority level L1. FIG. 4 is a diagram showing an example of a screen on which an example of a notification by solution notification section 52 is displayed. The screen example of FIG. 4 is displayed on at least one of display device 11 or first personal computer 31.

At the top of the screen example of FIG. 4, a problem event of "no electronic component found" is displayed, and at the second stage, "first electronic component mounter" is displayed as the location of occurrence of the problem event. This indicates that, in first electronic component mounter 23, although the suction nozzle should have picked up an electronic component from the feeder device, it is determined that there is no electronic component according to image processing by the component camera. In response to this problem event, solutions are displayed in the form of a list in the third and subsequent columns of the screen example.

The list consists of four columns: No., solution, set authority level, and effectiveness rate. Twenty-five solutions No. 1-25 are ranked sequentially from E1 with high effectiveness rate to E25 with low effectiveness rate. The effectiveness rate E1 to E25 are actually represented by numerical values, for example, in the range of 1 to 0. In the solutions of No. 1 to 14 and No. 24, the set authority level is set to normal authority level L1, and this is indicated by displaying "L1". Thus, solutions No. 1 to No. 14 and No. 24 can be implemented by an operator.

In solutions No. 15 to 23 and No. 25, the set authority level is set to the high-rank authority level L2, and this is indicated by displaying "L2". Thus, solutions Nos. 15 to 23 and No. 25 are usually not executable by a normal worker and can only be implemented by a high-rank worker. It should be noted that the set authority level may be represented by a difference in display color of each solution without providing the setting authority level column.

The eight types of solutions Nos. 1 to No. 8 involve confirming the operational state of the feeder device. Solution No. 9 is a solution that involves exchanging a feeder device. The five solutions of Nos. 10 to 14 involve checking the operational state of the suction nozzle. Solution of No. 24 is a solution that involves dealing with the deterioration of the image function due to the presence of lens contamination of the component camera or fallen components. These solutions in which the normal authority level L1 is set are not restricted in the conditions that can be implemented, can be easily performed in a relatively short time, and the operating conditions of first electronic component mounter 23 are not changed before and after implementing the solutions.

On the other hand, the seven types of solutions No. 15 to No. 17 and No. 20 to No. 23 are solutions for editing and changing operating conditions of first electronic component mounter 23. Even if the operator attempts to edit these operating conditions, since the high-rank authority level L2 is not set, changing the operating conditions is prohibited. Solution No. 18 is a solution involving exchanging of the suction nozzle and involves, for example, changing the nozzle diameter. Solution No. 19 is a solution involving exchanging of the reel on which carrier tape is wound. In this solution, even in the case of electronic components of the same specification, there is a possibility that the component conditions slightly change depending on differences in component vendors. Solution No. 25 is a solution involving maintenance or exchanging of the mounting head.

In these solutions in which the high-rank authority level L2 is set, conditions that can be implemented are limited, or it is difficult to return to the original operating conditions once operating conditions are changed. Therefore, solutions of the high-rank authority level L2 are solutions to be carefully implemented and are not usually implemented by an operator. However, in the present embodiment, there are cases where an operator executes a solution on behalf of a person having high-rank authority level L2 with approval of a proxy application, which will be described later.

At the bottom of the screen example of FIG. 4, a software switch called "Notify high-rank worker" is provided. Also, "L2" which refers to high-rank authority level L2 in the set authority level column is also a software switch.

At the time the example screen of FIG. 4 is displayed, the operator considers the adoption of three options. The operator operates the software switch of the first option "Notify high-rank worker" when the problem event is difficult and considered difficult to resolve by themselves. In other words, the operator clicks the pointer of the mouse of input device 12 over the "Notify high-rank worker". This operation corresponds to requesting assistance from a high-rank worker.

The operator also operates the second alternative, "L2" software switch when any of the non-implementable solutions are deemed valid. In other words, the operator clicks the pointer of the mouse of input device 12 by superimposing the pointer on any one of the "L2" software switches. This operation corresponds to applying for proxy implementation of a solution in which high-rank authority level L2 is set. The operator can also operate multiple "L2" software switches.

Further, the operator initiates a solution as a third option when any of the possible solutions are deemed valid. In other words, the operator proceeds to implement a solution in which normal authority level L1 is set, without operating the software switch.

In step S6 of FIG. 2, high-rank worker notification section 53 determines whether the software switch of "Notify high-rank worker" has been operated. If the software switch has been operated, in step S7, high-rank worker notification section 53 notifies a high-rank worker having high-rank authority level L2 that a problem event has occurred and requests assistance in response to the request of the operator. This notification is transmitted to second personal computer 32 of the high-rank worker by e-mail.

In response to the request, when the high-rank worker performs the login process from input device 12 or second personal computer 32, the execution of the process returns to step S3. In the second step S3, board production management device 1 authenticates the worker is a high-rank worker who performs countermeasure operations. In the second authority authentication step S4, authority authenticating section 51 authenticates the executory authority level of the high-rank worker as high-rank authority level L2.

In the second solution notification step S5, solution notification section 52 gives a notification corresponding to high-rank authority level L2. The notification corresponding to high-rank authority level L2 is displayed on at least one of display device 11 and second personal computer 32. Although the screen example of FIG. 4 is displayed even in the notification corresponding to high-rank authority level L2, the software switch of "Notify high-rank worker" and the software switches of "L2" are not displayed. Further, when a high-rank worker performs the countermeasure operation, steps S6 to S12 are unnecessary and the execution of the process proceeds immediately to step S13.

If the "Notify high-rank worker" switch has not been operated in step S6, then in step S8, proxy application section 54 determines whether there is an operation of the "proxy application", that is, an operation of the software switch of "L2". In the case in which there has been an operation in proxy application step S9, proxy application section 54 notifies the high-rank worker that the operator has made an application for proxy execution of a solution that cannot be implemented. This notification is transmitted to second personal computer 32 of the high-rank worker by e-mail. The high-rank workers reply to proxy approval section 55 by e-mail as to whether the proxy has been approved.

In step S10, proxy approval section 55 determines whether the "proxy application" has been approved. In the case where the "proxy application" is approved in proxy approval step, the proxy approval section 55 permits the proxy of the solution of the No. corresponding to the operated "L2". This permission is transmitted to the operator, for example, by displaying "proxy permitted" instead of "L2" for the solution.

In the case where the "proxy application" is not approved in step S12, proxy approval section 55 rejects the proxy of the solution of the No. corresponding to the operated "L2". This rejection is transmitted to the operator, for example, by displaying "proxy rejection" instead of "L2" of the solution of the number. After step S12, the execution of the process returns to the solution notification step S5. In the second solution notification step S5, the operator can again examine whether the above-mentioned three options are to be adopted.

After the login process is performed by the high-rank worker and the second solution notification step S5 has been completed, and there is no "proxy application" operation in step S8, then after proxy approval step S11, the execution of the process proceeds to step S13. High-rank workers or operators sequentially implement solutions in the order of solutions listed in FIG. 4. At this time, since the effectiveness rate of multiple solutions can be seen at a glance, the countermeasure operation is efficiently performed. When a problem event is resolved by execution of a countermeasure operation, the execution of the process proceeds to the effective amount collection step S14 in FIG. 3.

In the effectiveness rate collection step S14, the effect amount collection section 56 links and collects the authority level of the worker who performed the countermeasure operation, the implemented solution, and the amount of effect obtained by the implemented solution. Here, there are often multiple solutions, and all solutions implemented are targeted regardless of the effect amount. The effect amount needs to be evaluated and quantified, for example, by scoring with a range from 1 to 0. When the effect amount is 1, it means that the problem event can be completely solved with just one adequate solution. If the effect amount is 0, this means that the solution has not contributed at all to the resolution of the problem event. The effect amount may be distributed to multiple solutions.

In the next step S15, the effectiveness-rate learning section 57 sets the magnitude of a learning coefficient α based on the execution authority level of the worker. In the next step S16, effectiveness-rate learning section 57 corrects the effectiveness rate of the implemented solution by multiplying the obtained effect amount by the learning coefficient α and feeding it back to the effectiveness rate of solution database 14. Steps S15 and S16 correspond to the effectiveness-rate learning step of the present disclosure. After step S16, execution of the process is returned to the beginning.

Figure 5:
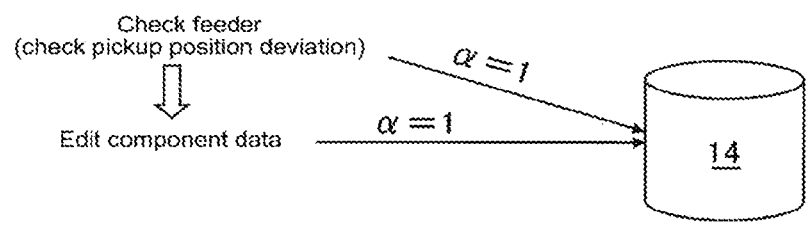
FIG. 5 is a diagram schematically illustrating a function of an effectiveness-rate learning section, and illustrates a case where a high-rank worker implements the countermeasure operation.
Figure 6:
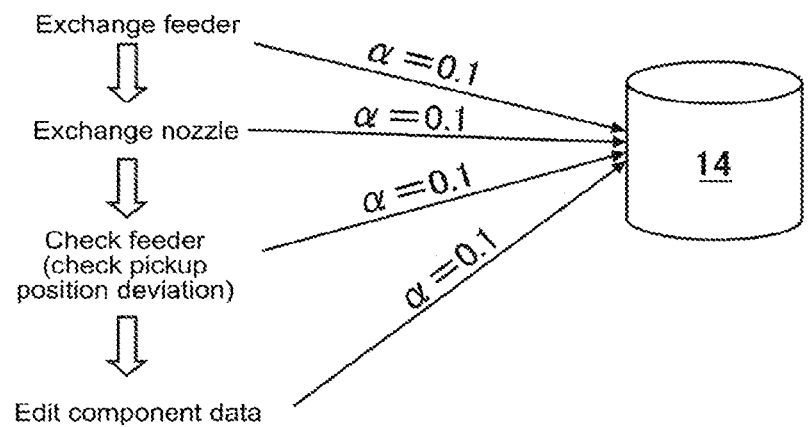
FIG. 6 is a diagram schematically illustrating a function of an effectiveness-rate learning section, and illustrates a case where an operator implements the countermeasure operation.

FIGS. 5 and 6 are diagrams for schematically describing the function of effectiveness-rate learning section 57: FIG. 5 illustrates a case where a high-rank worker performs a handling operation, and FIG. 6 illustrates a case where an operator performs a countermeasure operation. The problem event in FIGS. 5 and 6 is a "no electronic component found" event as shown in FIG. 4.

As shown in FIG. 5, the high-rank worker resolves the problem event by first performing solution No. 4, which is to check the feeder (i.e., to check for deviations of the pickup position), and then performing solution No. 22, which is to edit component data. The high-rank worker appropriately determines the respective effect amounts of the effective solutions No. 4 and No. 22. Effectiveness-rate learning section 57 sets the learning coefficient α to 1 based on the high-rank authority level L2 of the high-rank worker. Further, effectiveness-rate learning section 57 multiplies each effect amount of the effective solutions No. 4 and No. 22 by the learning coefficient α (=1), and feeds back the result to the effectiveness rate E4 and E22 of the solution database 14.

Further, as shown in FIG. 6, the operator first implements solution 9, which is to exchange the feeder, and second, implements solution 18 with proxy approval, which is to exchange the nozzle. Since the problem event is not resolved despite these solutions, the operator consults with the high-rank worker to implement solutions No. 4 and No. 22 to resolve the problem event. Thus, inexperienced operators tend to implement wasteful solutions No. 9 and No. 18.

The operator determines that the effect level of each of ineffective solutions No. 9 and No. 18 to be 0, and appropriately determines each effect level of effective solutions No. 4 and No. 22 to be suitable. Effectiveness-rate learning section 57 sets the learning coefficient α to 0.1 based on normal authority level L1 of the operator. Further, effectiveness-rate learning section 57 multiplies each effect level of solutions No. 9, No. 18, No. 4, and No. 22 by the learning coefficient α (=0.1), and feeds back the results to effect levels E9, E18, E4, and E22 of solution database 14.

Effectiveness-rate learning section 57 obtains effectiveness rate values by averaging multiple effect levels performed in the past with respect to a certain solution. At this time, since the weighted average value, which takes into consideration the learning coefficient α, is obtained, the high-precision solution implemented by the high-rank worker is reflected in the effectiveness rate value with a weight that is 10 times the weight of the solution implemented by the operator. As a result, high-precision solutions can be prioritized and the accuracy of the effectiveness rate value can be increased, thereby contributing to a quick resolution of the problem event.

For example, the respective effectiveness rate values E4, E22 of solutions No. 4, No. 22 which were effective this time are modified to be significantly higher when implemented by a high-rank worker and slightly higher when implemented by an operator. Also, effectiveness rate values E9, E18 of No. 9, No. 18 which were ineffective this time are corrected to be slightly lower when implemented by an operator. Modified effectiveness rate values E4, E22, E9, E18 are reflected in the next solution notification step S5.

3. Mode and Effect of Board Production Management Device 1

Board production management device 1 of the embodiment manages board production line 2 for producing a board on which electronic components are mounted, and comprises: a solution memory section (solution database 14) that stores a problem event that may occur in the board production line 2 and that requires a countermeasure operation, a solution to serve as the countermeasure operation, and a set authority level that is an authority level set for an operator who may implement a solution, authority authenticating section 51 that authenticates an authority level of an operator who implements a countermeasure operation; and solution notification section 52 that, when the problem event occurs, separately reports an implementable solution that corresponds to a set authority level equal to or less than the execution authority level, and an unexecutable solution that corresponds to a set authority level that exceeds the execution authority level.

According to this, when a problem event occurs, solution notification section 52 compares normal authority level L1 of the operator who is the worker with the set authority level of the solution, and separately reports the solution of normal authority level L1 that can be implemented by the operator (solutions of Nos. 1 to 14 and No. 24) and the solution of high-rank authority level L2 that cannot be implemented by the operator (solutions of Nos. 15 to 23 and No. 25). Here, high-rank authority level L2 is set as a solution to be carefully implemented. As a result, there is no risk that a less experienced operator will carelessly implement a solution that should be carefully implemented thereby causing another problem event, which contributes to a quick resolution of the problem event.

Further, board production management device 1 of the embodiment further includes high-rank worker notification section 53 for reporting an occurrence of a problem event to a high-rank worker, having high-rank authority level L2, who handles an unexecutable solution in response to a request of a worker as an operator. As a result, the operator can request assistance from the high-rank worker when the problem event is difficult and is considered difficult to solve by themselves. Therefore, it is possible to prevent the operator from having to handle a difficult problem event alone, thereby contributing to a quick resolution of the problem event.

Further, board production management device 1 of the embodiment further includes proxy application section 54 for notifying a high-rank worker having a high-rank authority level L2 who is capable of handling an unexecutable solution when an operator, as a worker, applies for proxy execution of an unexecutable solution, and proxy approval section 55 for permitting the operator to perform proxy execution of an unexecutable solution when the high-rank worker approves the application. According to this, when any of the solutions that cannot be implemented is considered to be effective, the operator can perform the solution on behalf of a high-rank worker by obtaining the approval of the high-rank worker. This eliminates the need for a high-rank worker to go to the site and implement the solution, thereby contributing to a quick resolution of the problem event.

Further, board production management device 1 of the embodiment is a board production management device for managing board production line 2, for producing a board on which electronic components are mounted, comprising: a solution memory section (i.e., a solution database 14) for linking and storing a problem event that may occur in board production line 2 and that requires a countermeasure operation, a solution to serve as the countermeasure operation, and an effectiveness rate which contributes to resolving the problem event; authority authenticating section 51 for authenticating an execution authority level that is the authority level of the worker implementing the countermeasure operation; an effect amount collection section 56 for linking and collecting, when the problem event occurs, the execution authority level of the worker, the solution implemented by the worker, and the effect amount obtained by the implemented solution; an effectiveness-rate learning section 57 for correcting the effectiveness rate of the implemented solution by setting a magnitude of a learning coefficient α according to the authority level of the worker, multiplying the obtained effect amount by the learning coefficient α, and feeding back the result to the effectiveness rate.

As a result, effectiveness-rate learning section 57 corrects the effectiveness rate of the executed solution by setting the magnitude of the learning coefficient α based on the execution authority level of the worker, multiplying the obtained effect amount by the learning coefficient α, and feeding back the result. That is, a high-precision solution implemented by a high-rank worker having a high authority level is multiplied by a large learning coefficient α (=1), and a low-precision solution implemented by an operator having a low authority level is multiplied by a small learning coefficient α (=0.1) to correct the effectiveness rate. As a result, high-precision solutions can be prioritized and the accuracy of the effectiveness rate value can be increased, thereby contributing to a quick early resolution of the problem event.

Further, the board production management method of the embodiment manages board production line 2 for producing a board on which electronic components are mounted, and comprises: a solution memory step (i.e., step that builds solution database 14 in advance) for storing a problem event that may occur in the board production line 2 and requires a countermeasure operation, a solution to serve as the countermeasure operation, and a setting authority level that is an authority level set to an operator who may implement a solution; authority authentication step S4 that authenticates an execution authority level that is the authority level of the operator who implements a countermeasure operation; and solution notification step S5 that, when the problem event occurs, separately reports an executable solution that corresponds to a setting authority level equal to or less than the authority level, and an unexecutable solution that corresponds to a setting authority level that exceeds the execution authority level.

As a result, similarly to board production management device 1 of the embodiment, there is no risk that an inexperienced operator will carelessly implement a solution that should be carefully implemented to cause another problem event, thereby contributing to an early resolution of the problem event.

Further, the board production management method of the embodiment is a board production management method for managing the board production line 2, for producing a board on which electronic components are mounted, comprising: a solution memory step (i.e., a step of building the solution database 14 in advance) for linking and storing a problem event that may occur in the board production line 2 and that requires a countermeasure operation, a solution to serve as the countermeasure operation, and an effectiveness rate that indicates an extent to which the solution contributes to resolving the problem event; an authority authentication step S4 for authenticating an execution authority level that is an authority of a worker implementing the countermeasure operation; an effect amount collection step S14 for linking and collecting, when the problem event occurs, the execution authority level of the worker the solution implemented by the worker, and the effect amount obtained by the implemented solution; and an effectiveness rate learning step (step S15, S16) for correcting the effectiveness rate of the implemented solution by setting a magnitude of a learning coefficient α according to the authority level of the worker, multiplying the obtained effect amount by the learning coefficient α, and feeding back the result to the effectiveness rate.

According to this, similarly to board production management device 1 of the embodiment, since the high-precision solution is prioritized and the reliability of the effectiveness rate is enhanced, it is possible to contribute to a quick resolution of the problem event.

4. Application and Modification of the Embodiment

Board production management device 1 of the embodiment manages all of board production line 2, but is not limited thereto. That is, board production management device 1 may be configured to manage only a part of the board production devices constituting board production line 2, for example, electronic component mounters 23 and 24. Personal computers 31, 32 may be portable terminals connected by wireless communication.

Furthermore, there may be three or more authority levels. Further, the notification method of solution notification section 52 described in the embodiment and the example of the screen on which notification content is displayed can be changed as appropriate. Further, the learning coefficient α (=1) of the high-rank worker and the learning coefficient α (=0.1) of the operator are examples, and different learning coefficients α may be set according to the degree of proficiency of the high-rank worker and the operator. Various other applications and modifications of the present disclosure are possible.

REFERENCE SIGNS LIST

1: board production management device, 11: display device, 12: input device, 13: memory device, 14: solution database (solution memory section), 2: board production line, 21: solder printing machine, 22: solder inspection machine, 23: first electronic component mounter, 24: second electronic component mounter, 25: board appearance inspection machine, 26: reflow machine, 27: rolling tower, 31: first personal computer, 32: second personal computer, 51: authority authenticating section, 52: solution notification section, 53: high-rank worker notification section, 54: proxy application section, 55: proxy approval section, 56: effect amount collection section, 57: effectiveness rate learning section, α: learning coefficient

The invention claimed is:

1. A board production management device for managing a board production line including a plurality of board production devices that produce a board on which an electronic component is mounted, the board production management device comprising:
a solution memory configured to link and store a problem event that may occur in a board production device of the plurality of board production devices and that requires a countermeasure operation, a solution to serve as the countermeasure operation, and a set authority level that is set to a worker authorized to implement the solution; and
processing circuitry configured to determine if the problem event occurs in the board production device, the processing circuitry including:
an operator login section configured to login an operator of the board production device to determine if the operator is the worker authorized to implement the solution;
an authority authenticating section configured to determine if an execution authority level of the operator is the authority level of the worker authorized to implement the countermeasure operation;
a solution notification section configured to display to the operator a list of potential solutions to the problem event, the list including an executable solution corresponding to the set authority level equal to or less than the execution authority level of the operator who logged in, and an inexecutable solution corresponding to a set authority level exceeding the execution authority level, list including the set authority level and an effectiveness rate for each of the potential solutions; and
a high-rank worker notification section configured to notify a high-rankworker of an occurrence of the problem event in response to a request from the operator, the high-rank worker having an authority level equal to or higher than a set authority level corresponding to the inexecutable solution on the list.

2. A board production management device for managing a board production line including a plurality of board production devices that produce a board on which an electronic component is mounted, the board production management device comprising:
a solution memory configured to link and store a problem event that may occur in a board production device of the plurality of board production devices and that requires a countermeasure operation, a solution to serve as the countermeasure operation, and a set authority level that is set to a worker authorized to implement the solution; and
processing circuitry configured to determine if the problem event occurs in the board production device, the processing circuitry including:
an operator login section configured to login an operator of the board production device to determine if the operator is the worker authorized to implement the solution;
an authority authenticating section configured to determine if an execution authority level of the operator is the authority level of the worker authorized to implement the countermeasure operation;
a solution notification section configured to display to the operator a list of potential solutions to the problem event, the list including an executable solution corresponding to the set authority level equal to or less than the execution authority level of the operator who logged in, and an inexecutable solution corresponding to a set authority level exceeding the execution authority level, list including the set authority level and an effectiveness rate for each of the potential solutions;
a proxy application section configured to notify a high-rank worker having an authority level equal to or higher than a set authority level corresponding to the inexecutable solution when the operator applies for a proxy application of the inexecutable solution; and
a proxy approval section configured to allow the operator to implement the inexecutable solution as a proxy when the high-rank worker approves the proxy application.

3. The board production management device of claim 1, wherein the processing circuitry includes:
an effect amount collection section for linking and collecting, when the problem event occurs, the execution authority level of the worker, the solution implemented by the worker, and an effect amount obtained by the implemented solution; and
an effectiveness-rate learning section configured to correct the effectiveness rate of the implemented solution by setting a magnitude of a learning coefficient according to the authority level of the worker, multiplying the obtained effect amount by the learning coefficient, and feeding back the result to the effectiveness rate.

4. A board production management method for managing a board production line including a plurality of board production devices that produce a board on which electronic components are mounted, comprising:
a solution memory step for linking and storing a problem event that may occur in a board production device of the plurality of board production devices and that requires a countermeasure operation, a solution to serve as the countermeasure operation, and a set authority level that is set to a worker authorized to implement the solution;
a determining step to determine if the problem event occurs in the board production device;
an operator login step configured to login an operator of the board production device to determine if the operator is the worker authorized to implement the solution;
an authority authentication step for determining if an execution authority level of the operator is the authority level of the worker authorized to implement the countermeasure operation;
a solution notification step for separately displaying, to the operator a list of potential solutions to the problem event, the list including an executable solution corresponding to a set authority level equal to or less than the authority level of the operator, and an inexecutable solution corresponding to a set authority level exceeding the execution authority level of the operator; and
a high-rank worker notification section step for notifying a high-rank worker of an occurrence of the problem event in response to a request from the operator, the high-rank worker having an authority level equal to or higher than a set authority level corresponding to the inexecutable solution on the list.

5. The board production management method of claim 4, further comprising:

an effect amount collection step for linking and collecting, when the problem event occurs, the authority level of the worker, the solution implemented by the worker, and an effect amount obtained by the implemented solution; and an effectiveness rate learning step for correcting the effectiveness rate of the implemented solution by setting a magnitude of a learning coefficient according to the authority level of the worker, multiplying the obtained effect amount by the learning coefficient, and feeding back the result to the effectiveness rate.

6. The board production management device of claim 1, wherein the problem event includes at least one of a component pickup error, a board conveyance error, and a board inspection error.

* * * * *